Patented July 26, 1932

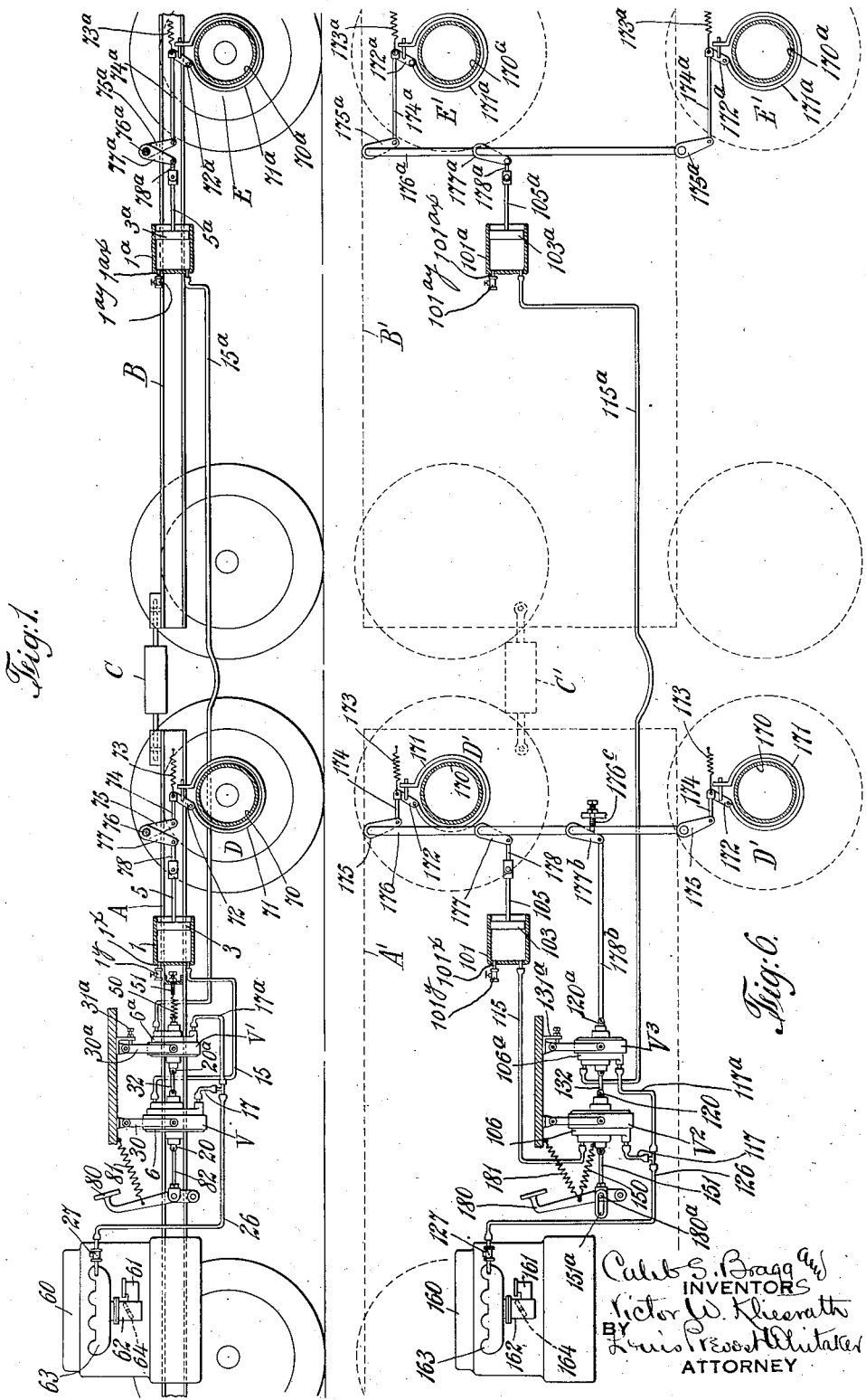
July 26, 1932. C. S. BRAGG ET AL 1,868,725
BRAKE SYSTEM FOR AUTOMOTIVE VEHICLES
Filed Sept. 1, 1928 4 Sheets-Sheet 1

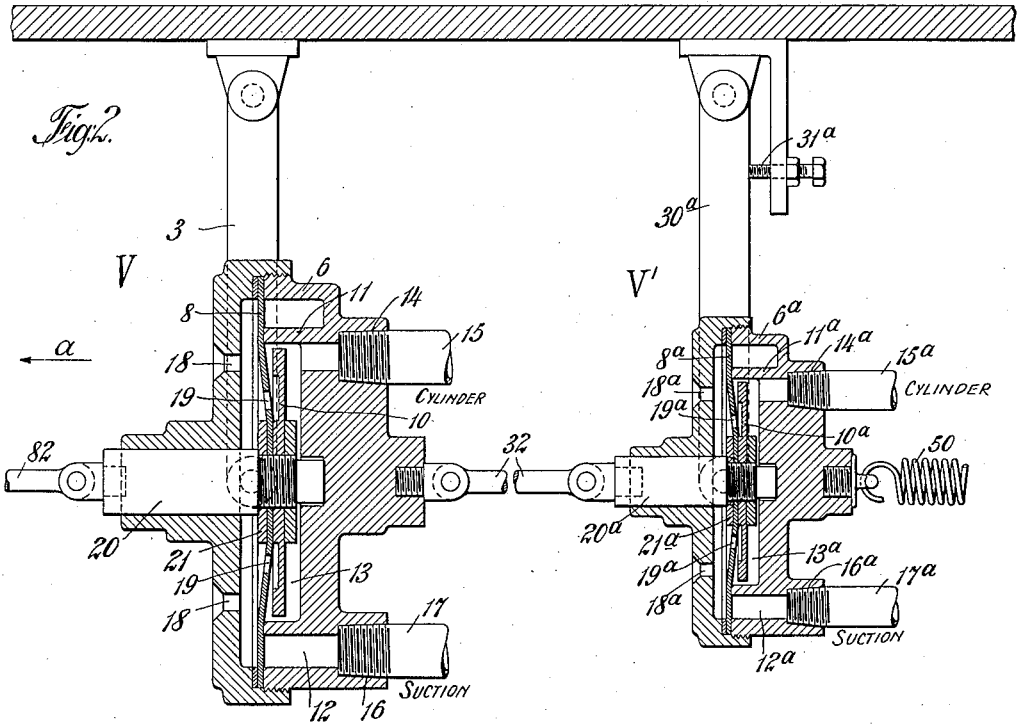
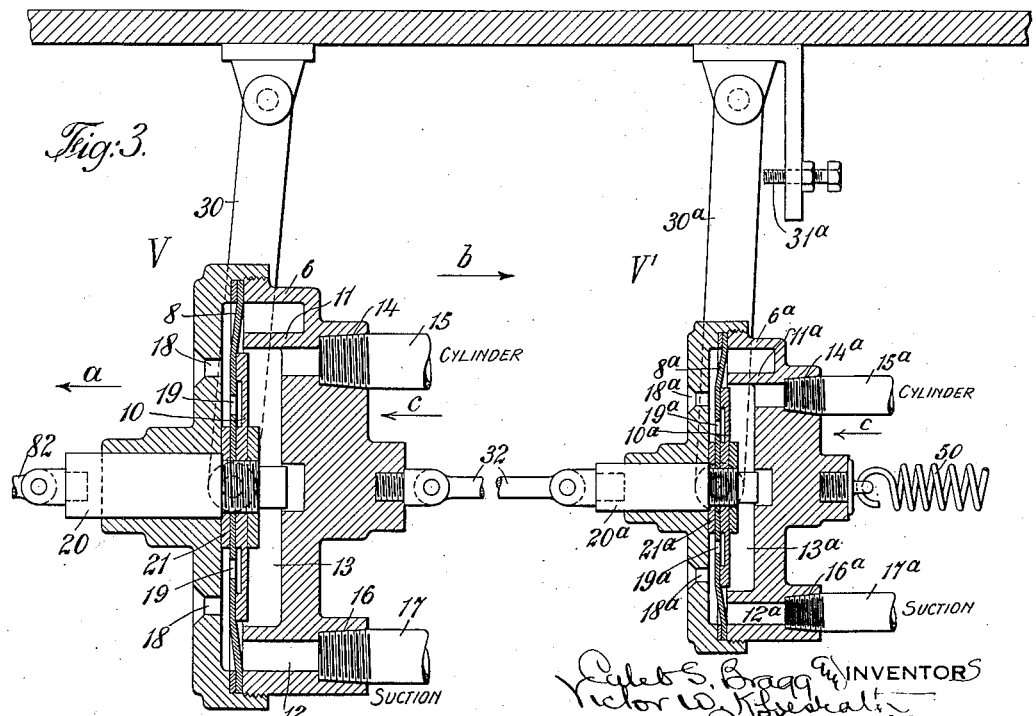

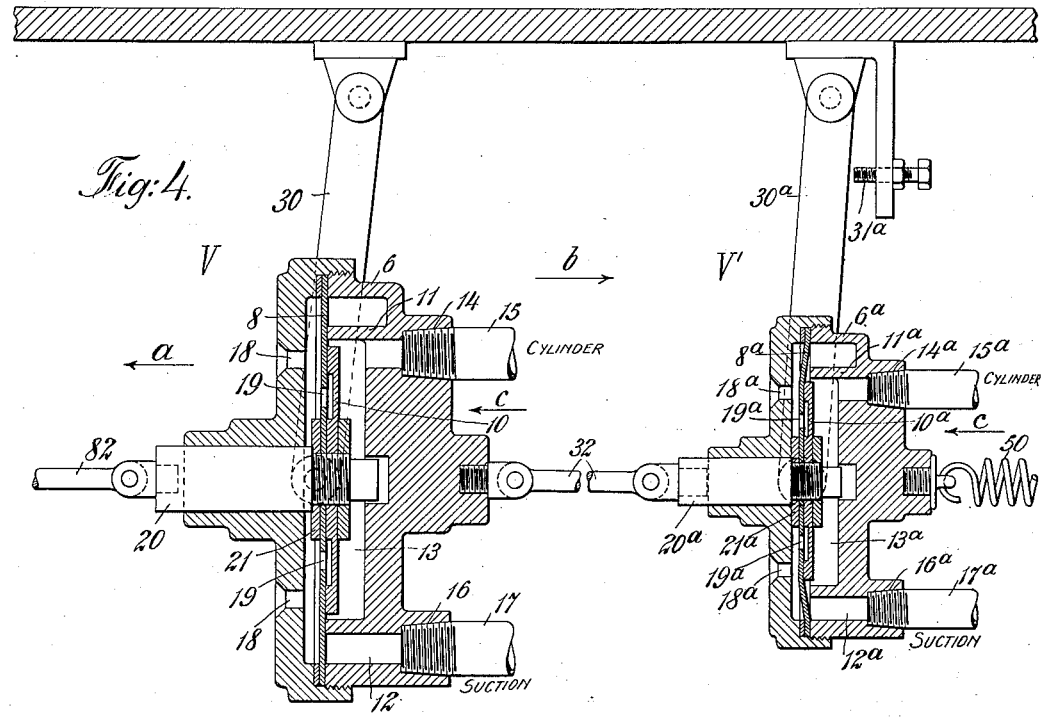
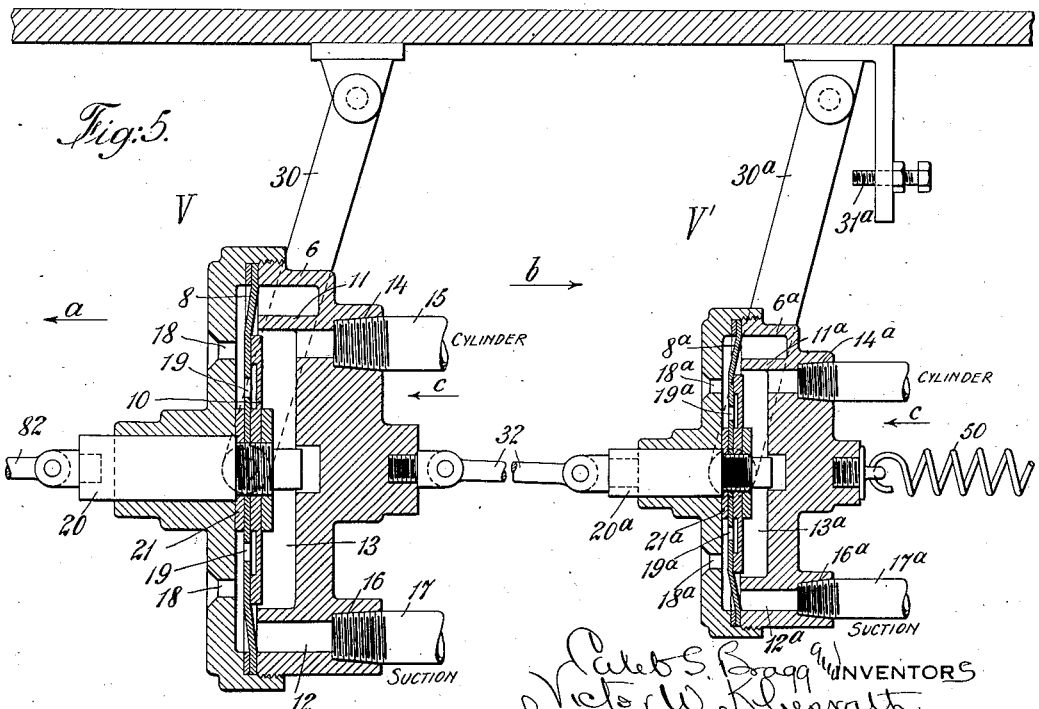

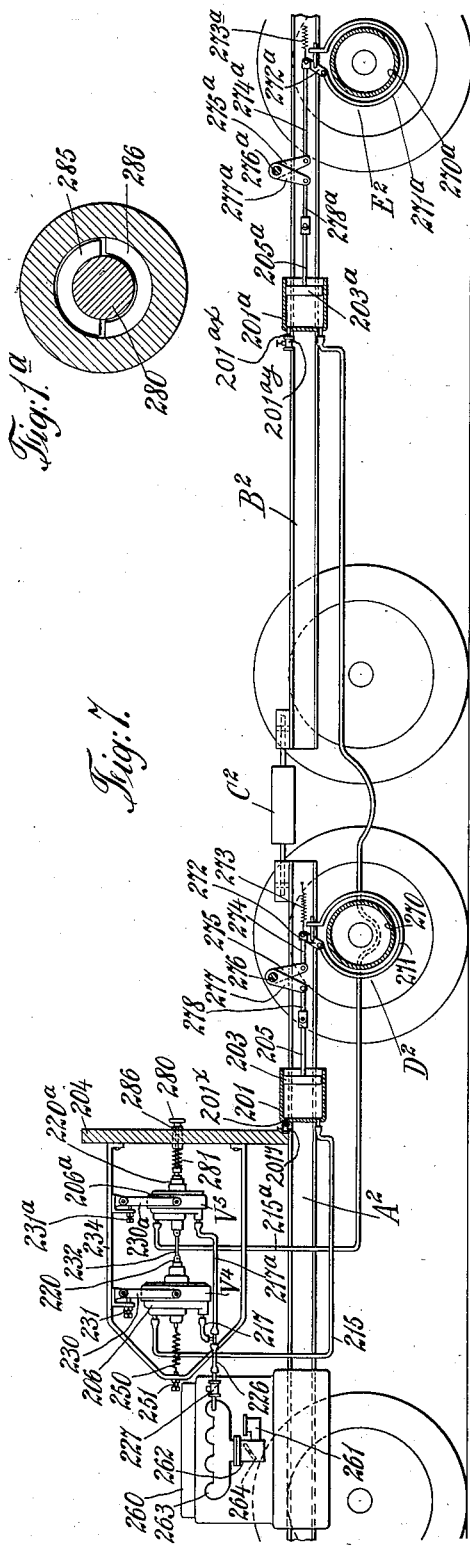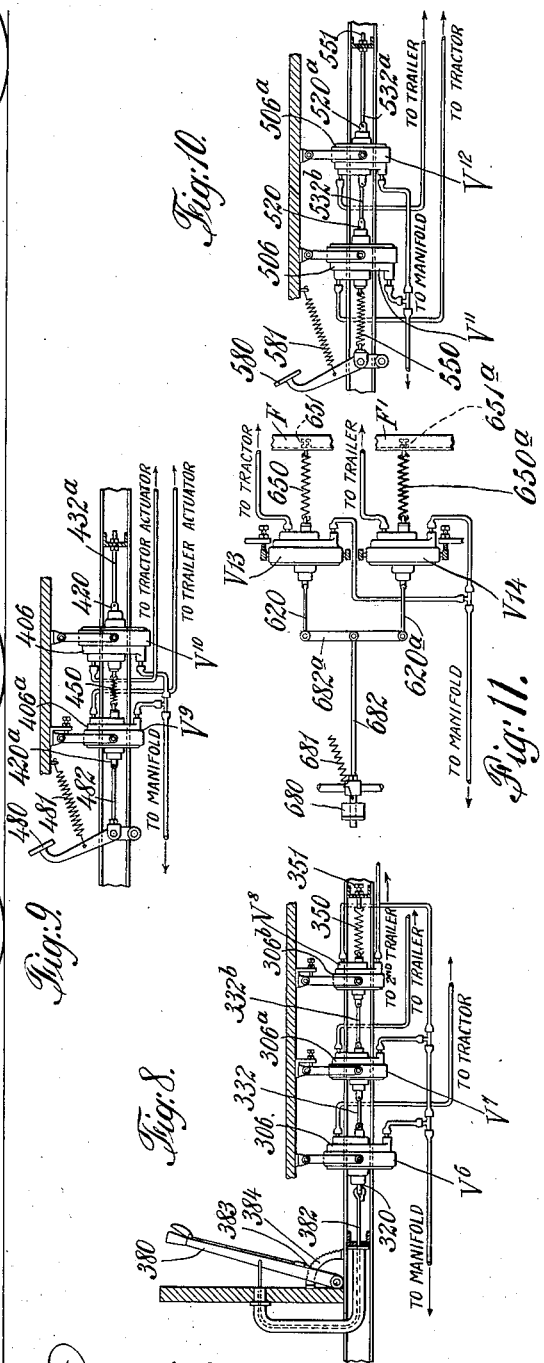

1,868,725

UNITED STATES PATENT OFFICE

CALEB S. BRAGG, OF PALM BEACH, FLORIDA, AND VICTOR W. KLIESRATH, OF PORT WASHINGTON, NEW YORK, ASSIGNORS TO BRAGG-KLIESRATH CORPORATION, OF LONG ISLAND CITY, NEW YORK, A CORPORATION OF NEW YORK

BRAKE SYSTEM FOR AUTOMOTIVE VEHICLES

Application filed September 1, 1928. Serial No. 303,413.

Our invention consists in the novel features hereinafter described, reference being had to the accompanying drawings which show several embodiments of our invention selected by us for purposes of illustration, and the said invention is fully disclosed in the following description and claims.

The object of our invention is to provide in connection with a plurality of power actuators operating by differentials of fluid pressures, preferably by the differential between rarification conveniently obtained by a connection with the intake manifold or suction passage of an internal combustion engine between the throttle valve and the engine cylinders, and a higher fluid pressure as atmosphere, a plurality of valves, each of which controls one or more of said actuators, all of said valves being operated by a single operator operated part, each valve mechanism being so constructed as to provide portions subjected to differentials of fluid pressures corresponding to those to which the opposite faces of the movable part or parts of the actuator or actuators which it controls are exposed, and acting on the valve mechanism in a direction to prevent further increase in said differential of pressures, said valve mechanisms being interposed in connections between the operator operated part and a part which is either rigid or has a limited movement, said connections being provided with yielding means acting upon the valve mechanisms in opposition to the differential of fluid pressures thereon, the tension of said yielding means being varied by the movement of the operator operated part, and the construction being such that the differential of fluid pressures on one of said valve mechanisms will overcome the tension of the yielding means operative in respect thereto during a power stroke of said actuators, and thereby effecting a movement of said valve mechanism to prevent further increase in the differential of pressures on the movable part of the actuator controlled thereby before the yielding means operative on another or other valve mechanisms is overcome, so as to effect the operation of one actuator or certain actuators or their actuation to a predetermined extent before the operation of another or other of said actuators.

In the preferred form of our invention this result is accomplished by providing a single yielding means or spring for all of said valve mechanisms, and making the parts of different valve mechanisms exposed to differentials of fluid pressures of different areas, but it is to be understood that the same result may be obtained by making the valve mechanisms of the same size and providing yielding means of different capacities for the different valve mechanisms, as hereinafter described.

Our invention is particularly applicable to the operation of a vacuum brake system for automotive vehicles comprising a tractor vehicle and a trailer or trailers, in which each vehicle is provided with a power actuator for applying brake mechanism thereof under the control of separate valve mechanisms operated by a single operator operated part, and so constructed and arranged that the trailer brakes will always be effectively applied before the brakes of the tractor, and released after the brakes of the tractor have been released, so as to prevent the trailer from running up on the tractor, and thus eliminating to a large extent the danger of what is termed "jack-knifing."

In the accompanying drawings in which we have shown several embodiments of our invention for purposes of illustration, Fig. 1 represents a diagrammatic side elevation of a brake system for tractor and trailer vehicles embodying our invention.

Fig. 1a is a detail sectional view of the means for locking the pull rod shown in Fig. 7.

Fig. 2 is an enlarged detail view showing the separate valves having portions of different areas exposed to the differential of fluid pressures in their normal or released positions.

Fig. 3 is a similar view showing both of said valves in the open position to effect power strokes of the actuators controlled thereby.

Fig. 4 is a similar view showing the larger of said valves returned to closed position by the differential of fluid pressures thereon, while the smaller valve remains open.

Fig. 5 is a similar view showing both of said valves in open position and the tension of the yielding means increased to such an extent that it cannot be overcome by the differential of fluid pressures on either valve.

Fig. 6 is a diagrammatic view showing our invention embodied in a vacuum brake system for a tractor and trailer, in which the valve mechanism is operated by a foot lever, and in which provision is made for enabling the operator to apply his physical force to the brake mechanisms of the tractor.

Fig. 7 is a diagrammatic view of a modified embodiment of our invention in which the valve mechanisms are located on the dash, and operated by a pull rod.

Fig. 8 is a detail view of a modification of our invention showing three valve mechanisms of different sizes connected in tandem relation.

Fig. 9 is a detail view of another modification showing two valve mechanisms of different sizes with the yielding resistance interposed between them.

Fig. 10 is a detail view showing a further modification of the invention in which two valves of different sizes are shown, and the yielding resistance is located between the physically operable part and one of the valve mechanisms.

Fig. 11 is a detail view of a further modification in which the valve mechanisms are of the same size and are provided with springs of different capacities.

Referring to the embodiment of our invention illustrated in Figs. 1, 2, 3, 4 and 5 inclusive, we have illustrated in Fig. 1 diagrammatically an automotive tractor vehicle indicated as a whole at A, and a trailer indicated at B, connected thereto, by suitable coupling, C, the said vehicles being provided with a vacuum brake system embodying our invention. The tractor vehicle, A, is provided with an internal combustion engine, 60, for propelling it, having the usual carburetor, 61, and suction passage, comprising a vertical portion, 62, and intake manifold, 63, the suction passage being provided with the usual throttle valve, 64. The tractor vehicle is shown provided with brake mechanism indicated at D, applied to the rear or non-steering wheels, but it is to be understood that it may be provided with brake mechanisms for any desired number of wheels and of any desired character. As shown, each of said brake mechanisms comprises a brake drum, 70, brake band, 71, brake lever, 72, and retracting spring, 73, one of the brake mechanisms being shown in Fig. 1. The tractor vehicle is shown provided with a power actuator for operating the brake mechanisms of the vehicle, comprising in this instance a cylinder, 1, closed at one end and open to the atmosphere at the other, and having a piston, 3, the piston rod, 5, of which is connected by a link, 78, with an arm, 77, on a rock shaft, 76, shown in section in Fig. 1, and provided with arms, 75, one of which is shown in said figure, connected by rod, 74, one of which is shown, with the brake lever, 72, of the tractor, it being understood that a power stroke of the piston, 3, will apply the brake mechanisms for the tractor with which it is connected with a predetermined maximum force determined by the leverages in the connections between the piston and the brake mechanisms, the closed end of cylinder, 1, is shown provided with a pipe, $1^x$, for connecting it with the corresponding portion of another actuator cylinder for simultaneous operation therewith if desired, and this pipe is shown provided with a cock, $1^y$, for closing it when it is not used. The trailer, B, is provided with a power actuator, comprising a cylinder, $1^a$, and piston, $3^a$, operatively connected with brake mechanism, E, for the trailer in the same manner as previously described with reference to the tractor, the various parts of the brake mechanism and their connections with the power actuator being given the same reference numerals with the addition of the letter, $a$, to avoid repetition.

In this instance we have shown two valve mechanisms of similar construction but of different sizes for controlling the actuators, the valve mechanisms, V, controlling the power actuator for the tractor brakes, and the valve mechanism, $V^1$, controlling the power actuator for the trailer brakes. The specific form of valve mechanism herein shown is covered by our former application for Letters Patent filed November 7, 1927, and given Serial No. 231,724, and is not claimed herein, per se, and it will be only sufficiently described to enable our present invention to be clearly understood. The valve mechanisms are shown in sections enlarged in Figs. 2 to 5 inclusive, and as the construction of these two valve mechanisms is identical, we will describe only one and indicate the corresponding parts of the other by the same reference numerals with the addition of the letter, $a$. The valve mechanisms are shown in the normal or released position in Fig. 2, and referring for example to valve mechanism, V, it comprises a hollow casing, indicated at 6, provided interiorly with an annular seat, 11, dividing the adjacent portion of the casing into an annular suction chamber, 12, and a central chamber, 13, said seat being adapted to be engaged by diaphragm, 8, having its marginal portions in sealing engagement with the casing, and provided with apertures, 19, which are at all times in communication with the atmosphere through apertures, 18, in the casing, 6. Within the chamber, 13, is a disc valve, 10, having an annular seat for engaging the diaphragm to form an airtight connection and close off communication between chamber, 13, and the atmosphere. The disc valve and diaphragm are rigidly and sealingly connected with the valve actuating part, 20, movable through a central aperture in the casing. The casing is provided with an aperture, 14, communicating with the chamber, 13, and adapted to be connected by a pipe, 15, with the power actuator which the valve mechanism controls, in this instance the cylinder, 1. The casing is also provided with an aperture, 16, communicating with the suction chamber, 12, and adapted to be connected by a pipe, indicated at 17, with the main suction pipe, 26, which is in turn connected with the suction passage of the engine (the intake manifold) between the throttle valve and the engine cylinders, and is preferably provided with a check valve, 27. Each of the valve mechanisms is suspended, so as to be movable in the direction of its axis by means of a yoke, 30. As before stated, the valve, $V^1$, is of identical construction, and it is connected by pipe, $15^a$, with the actuator cylinder, $1^a$, and by pipe, $17^a$, with the suction pipe, 26. The valve mechanisms are supported coaxially in this instance, and the valve actuating part, $20^a$, of valve, $V^1$, is connected with the casing, 6, of valve, V, by a link, indicated at 32. The valve mechanism, $V^1$, is preferably provided with a stop, $31^a$, engaging the yoke, $30^a$.

Both valve mechanisms are connected to a single operator operated part, which in Fig. 1 is the foot lever, 80, pivotally mounted on the chassis, provided with a retracting spring, 81, and connected by a link, 82. The valve casing, $6^a$, of the valve, $V^1$, is connected with a yielding resistance member, in this instance a coil spring, 50, which may be either of the expansion or compression type, but is here shown as an expansion spring. The rear end of the spring, 50, is connected, in this instance as shown in Fig. 1, to a part of the chassis by means of an adjusting device or calibrating means, 51, by which the tension of the spring may be regulated. It will be understood that the operator operated part may be of any desired type and operated by the hand or foot, as preferred.

Each of the valve mechanisms is also provided with means for limiting the relative movement of the valve actuating part thereof and the valve casing. Thus in the valve mechanism, V, the valve actuating part, 20, is provided with a collar, 21, which will be brought into engagement with the casing when the valve actuating part has been drawn out to its fullest extent in the direction of the arrow, $a$, Fig. 2, and the valve mechanism, $V^1$, is provided with a similar collar, $21^a$. These stop collars serve to protect valves from injury in case the pedal lever is depressed more quickly than the air can be withdrawn from the respective actuator cylinders, and also to effect a direct connection from the pedal lever to the brake mechanism where the construction is such that the physical force of the operator can be applied through the valve mechanisms to certain of the brake mechanisms in addition to the power of the actuator, or to operate them in case of failure of power, as hereinafter described with particular reference to Fig. 6.

It will be seen that the retracting spring, 81, of the foot lever not only returns the latter to retracted position, but also holds the valve mechanisms, V, $V^1$, normally in the positions shown in Fig. 2, in which the diaphragm of each valve mechanism is seated and the disc valve thereof is unseated, thus connecting each of the actuator cylinders between its closed end and the adjacent face of the piston with the atmosphere, and as the opposite face of each actuator piston is exposed to atmospheric pressure at all times, the pistons may be said to be submerged in atmosphere or submerged in air at atmospheric pressure when the parts are in the released positions shown in Fig. 2.

Assuming that the engine is running with the throttle valve closed or partly closed, rarification will be produced in the suction passage of the engine and air will be exhausted from the suction pipe, 26, and from the annular suction chambers, 12 and $12^a$, of the valve mechanisms, V, $V^1$, each of which, in this position of the valves, is disconnected from the corresponding central chambers, 13 and $13^a$, respectively. The central portion of the diaphragm of each valve mechanism within the annular seat and the opposite faces of the disc valve are exposed to atmospheric pressure, while the portions of each diaphragm between the annular seat and the outer edge of the casing are exposed to vacuum in the suction chamber (12 or $12^a$) on one face and to atmospheric pressure on the other face, which differential of fluid pressures tends to press the diaphragm on its seat when the engine is running. Aside from this differential of fluid pressures, the pressures on the opposite faces of the diaphragms and disc valves and the front and rear portions of the casing are substantially equalized. The chamber, 12, of the valve mechanism, V, being larger than the chamber, $12^a$, of the valve mechanism, $V^1$, it will require more force to unseat the diaphragm, 8, than to unseat the diaphragm, $8^a$.

The operation of each valve mechanism with respect to the actuator controlled thereby is identical, and a description of the operation of one valve mechanism, as the valve mechanism, V, will be sufficient for both. When the valve actuating part, 20, is drawn forward in the direction of the arrow, a, in Fig. 2, the disc valve, 10, will be moved into sealing engagement with its diaphragm, 8, closing off communication between the cylinder, 1, and the air inlet apertures in the valve casing, and thereafter moving the diaphragm, 8, away from its seat into the position indicated in Fig. 3, so as to place the chamber, 13, and the actuator cylinder, 1, in communication with the adjacent suction chamber, 12, so that the exhaustion of air from the actuator cylinder will at once begin and will immediately cause a movement of the actuator piston in a direction to apply the brake mechanisms connected therewith, by reason of the differentials of fluid pressures on opposite faces of the piston. A corresponding differential of fluid pressures will begin to build up on the opposite faces of the diaphragm and disc valves of the valve mechanisms, acting in the direction of the arrow b in Fig. 3, in opposition to the direction of the movement of the operator operated part and increasing the initial resistance furnished by the retracting spring. This increase in resistance serves to apprise the operator of the extent to which the actuator is applying the brakes. A differential of fluid pressures will also be built up on the opposite faces of the rear wall of the valve casing due to the fact that the entire inner face of said wall is subjected to rarification when the diaphragm is unseated, while the outer or rear face is exposed at all times to atmospheric pressures. This differential of fluid pressures gradually increases as the air is exhausted from the actuator cylinder and is exerted in a direction to move the entire valve casing forward in the direction of the arrow, c, in opposition to the tension of the spring, 50. The fluid pressures on the opposite faces of the forward wall of the valve casing will always be substantially equal, as both faces will be exposed to atmospheric pressure. We have, therefore, in each valve mechanism a reactionary differential of fluid pressures on the valves, tending to push them rearwardly in the direction of arrow, b, in Fig. 3, with respect to the casing, and a differential of fluid pressures on the rear wall of the casing, tending to push the casing forward in the direction of the arrow, c, with respect to the valves, both acting to reseat the diaphragm as soon as they are able to overcome the increased tension of spring, 50, and thereby disconnecting the suction from the controlled actuator or actuators, to prevent further increase in the differential of fluid pressures on the piston or pistons thereof, but holding the brake mechanisms as applied, as the disc valve remains seated upon the diaphragm after the diaphragm has been seated, as described.

Referring now to Figs. 2, 3, 4 and 5, when the operator desires to apply the brakes for a normal deceleration of the vehicles, he will depress the foot lever, drawing the link rod and the valve, V, V¹, forward in the direction of the arrow, a, Fig. 2, a certain distance, and correspondingly increasing the tension of the spring, 50. As the chamber, 12, of valve mechanism, V, is larger than the chamber, 12ª, of valve mechanism, V¹, it will require more force to unseat the diaphragm, 8, than to unseat the diaphragm, 8ª, and therefore, as the pedal is moved forward with normal speed for an application of the brakes, the diaphragm, 8ª, will be unseated first, and the actuator cylinder on the trailer will be connected with the suction passage of the engine, applying the brakes of the trailer before those of the tractor. If the depression of the pedal continues with uniform speed, the diaphragm, 8, will be unseated before the resultant differential of fluid pressures on the valve and valve casing of the valve mechanism, V¹, can reseat the diaphragm, 8ª, against the tension of the spring, 50, which is being continually increased. The unseating of diaphragm, 8, will connect the actuator cylinder on the tractor with the suction passage of the engine, and the brakes of the tractor will begin to be applied while the brakes of the trailer are being further applied. If the movement of the pedal is stopped at an intermediate position of the pedal, the diaphragms, 8ª and 8, will be reseated as soon as the resultant differential of fluid pressures on the valves and valve casings of the respective valve mechanisms, V, V¹, exceed the increased tension of the spring, 50, due to the extent of movement of the pedal. The diaphragm, 8, however, being larger than the diaphragm, 8ª, will be seated with a less amount of resultant differential of fluid pressure per square inch than the diaphragm, 8ª, so that if both diaphragms close under such conditions the brakes of the trailer will have been applied with more force than those of the tractor. This condition will exist until the pedal has been moved to such an extent that it has increased the tension of the spring to such an extent that it cannot be overcome by the resultant differential of pressures on the diaphragm, 8ª, and the valve casing of valve mechanism, V¹, at which time the trailer brakes will be applied to the full extent of the actuator connected therewith. Any continued movement of the pedal thereafter will unseat the diaphragm, 8, or hold it unseated while holding the diaphragm, 8ª, open until the tension of the spring, 50, is increased to a point where it cannot be overcome by the resultant differential of fluid pressures on the diaphragm, 8, of the casing of valve mechanism, V, when the brakes of the tractor will be fully applied to the extent of the power of the actuator connected therewith.

It will thus be seen that in the application of the brakes the trailer brakes are always applied first before the tractor brakes and reach their greatest efficiency before the tractor brakes are fully applied, thus preventing the possibility of the trailer running up on the tractor and producing the effect known as "jack-knifing", which frequently results in serious accidents. This operation of the brake mechanisms of trailer and tractor will follow even if the operator operated part is moved to its maximum extent without stopping, in which case the valve mechanism, $V^1$, of smaller diameter will remain open continually, so as to apply the trailer brakes before the tractor brakes and with greater power than the tractor brakes, while the larger valve mechanism may intermittently close and open until the tension of the spring, 50, has become so great that it cannot be overcome by the differential of fluid pressures on the smaller valve, and the trailer brakes are fully applied, after which the larger valve will remain open until the tractor brakes are also applied by the full power of its actuator or actuators, and the valves will be in the positions shown in Fig. 5. It will thus be seen that upon either a gradual or a sudden and complete operation of the brake mechanisms, the differentials of fluid pressures on the valve casings of different areas will insure the slowing down of the trailer more rapidly than the tractor.

The release of the brake mechanisms is effected in a manner exactly the reverse of their application. When the operator relieves his pressure on the pedal after a full application of brakes of both trailer and tractor, the diaphragms of both valve mechanisms will seat, but as the disc valve, 10, is of greater area than the disc valve, $10^a$, it will open before the disc valve, $10^a$, admitting air to the actuator for the tractor brakes, and the tractor brakes will begin to be released before the brakes on the trailer, and if the operator removes his foot from the pedal for a full release of all the brakes, the tractor brakes will be fully released before those of the trailer, so that there will be no slack in the couplings between the vehicles when the operator steps on the accelerator to start or increase the speed of the vehicle. During the release of the brake mechanisms, the fluid pressures on opposite faces of the sections, 6 and $6^a$, of the valve casings will be equalized, the valve casings will be moved rearwardly by the spring, 50, and the disc valves will be seated on the diaphragms whenever the operator stops or arrests the rearward movement of his foot. The rearward movement of the valve casings will, of course, decrease the tension of the spring, 50, and this movement is the reverse of the movement of the valve casings in the opposite direction when the brakes are applied, which in that case increases the tension of the spring.

It will be understood that the size of the actuator cylinders and pistons and the leverages in the connections from the pistons to the brake mechanisms operated thereby, will be such as to give the maximum braking effect by power desired on both vehicles, which is preferably slightly less than would be sufficient to lock the wheels on ordinary dry roadways, but regardless of these facts the construction will be such that the trailer will be retarded to a greater extent than the tractor under all circumstances when the brakes are applied up to the point where, as before stated the maximum power of each actuator is exerted when they will of course be applied with the full power of the respective actuator. The retarding effect of the trailer brakes remains effective longer than those of the tractor when the brake mechanisms are released and the parts returned to the released positions.

In Fig. 6, we have shown in a diagrammatic view the resistance spring located between the pedal lever and one of the connected valve mechanisms, the valve mechanisms being in turn connected to a part having a certain amount of movement with respect to the vehicle, less than the throw of the pedal, and in this construction we have also provided a lost motion connection between the pedal and said relatively movable part, by which the operator may add his physical force to the brake mechanisms for the tractor after brake mechanisms for tractor and trailer have have been applied to the maximum extent of the power actuators. In this construction the parts corresponding with those previously described and illustrated in Fig. 1 are given the same reference characters with the addition of 100. The tractor vehicle is indicated by dotted lines at $A^1$, and the trailer vehicle is similarly indicated at $B^1$, connected to the tractor by the coupling indicated in dotted lines at $C^1$. $D^1$, $D^1$, represent brake mechanisms for the tractor, $E^1$, $E^1$, represent brake mechanisms for the trailer operatively connected with their respective power actuators, and $V^2$, $V^3$, represent the valve mechanisms of different diameters constructed and operating as previously described with reference to Figs. 1 to 5. In this instance the location of the spring, 150, and each of the valve mechanisms is reversed from the position shown in Figs. 1 to 5. The valve actuating part, $120^a$, of the valve mechanism, $V^3$, is connected by a link, $178^a$, with an arm, $177^b$, on the rock shaft, 176, for operating the tractor brake mechanisms. The valve actuating part, 120, of the valve mechanism, $V^2$, is connected by a link, 132, with the valve casing, $106^a$, of the valve mechanism, $V^3$, and the resistance spring, 150, has one end connected to the pedal lever and the other end connected to the valve casing, 106, of the valve mechanism, $V^2$. The foot lever, 180, is also provided with an independent retracting spring, 181, and the valve casing, 106, is also connected with a foot lever by a link rod, 151, provided with a slotted portion, 151ᵃ, for engaging a pin, 180ᵃ, on the foot lever. In this construction the forward movement of the foot lever will increase the tension of the spring, 150, and effect a relative movement of the valves with respect to the casing, to apply the brake mechanisms by power, the brake mechanisms for the trailer vehicle being applied first and reaching their maximum efficiency before the brake mechanisms for the tractor vehicle, in the manner previously described, until the tension of the spring has been increased to such an extent that it cannot be overcome by the differential of fluid pressures on the valve of greater diameter, when the brake mechanisms of both vehicles are fully applied, at which time the pin, 180ᵃ, will engage the outer end of the slot, 151ᵃ, in the link, 151, after which the operator, by exerting greater pressure on the pedal, can apply his physical force to the tractor brake mechanisms, V¹, V¹, if desired.

In Fig. 7 we have illustrated in a diagram similar to Fig. 1, a slightly modified arrangement in which the valve mechanisms are located forward of the dash and are operated by a pull rod, the spring and valve mechanisms being in the position shown in Fig. 6. The parts shown in Fig. 7 which correspond with those in Fig. 1, are given the same reference characters with the addition of 200, to avoid repetition. The tractor vehicle is represented at A², the trailer vehicle at B², connected with the tractor vehicle by a suitable coupling, indicated at C². D² represents the brake mechanisms for the tractor vehicle, of which one is illustrated, and E², represents the brake mechanisms for the trailer vehicles, one of which is illustrated, the connections between the actuator pistons, 203 and 203ᵃ, and their respective brake mechanisms, and the pipe connections from the cylinders, 201 and 201ᵃ, and their respective valve mechanisms, V⁴ and V⁵, being the same as previously described. In this instance the valve mechanisms are supported by a frame, 234, secured to the dash, 204. The casing, 206, of the valve mechanism, V⁴, is connected to one end of the resistance spring, 250, the other end of the spring being connected to the calibrating or adjusting means, 251, secured to the frame, 234. The valve actuating part, 220, of the valve mechanism, V⁴, is connected by link, 232, with the valve casing, 206ᵃ, of valve mechanism, V⁵, is connected with a hand operated pull rod, 280, provided with a retracting spring, 281. We may also provide means for locking the pull rod, 280, in any position to which it may be drawn out, which may be of any usual or preferred height. For example, we may provide the pull rod with a mutilated thread, 285, and provide the sleeve, 286, in the dash through which it extends, with a similar mutilated thread, as shown in cross section in Fig. 1a, so that after the rod is pulled out the desired distance, the mutilated thread portions of the sleeve and rod may be locked by slightly rotating the pull rod. In this arrangement of the valve mechanism, the stops for arresting the return movement of the valve casing, indicated at 231 and 231ᵃ, are located on the forward side of the yokes, 230 and 230ᵃ. The operation of the valve mechanisms in the control of the actuators and the brake mechanisms operated thereby, will be exactly the same as previously described.

In Fig. 8 we have shown an arrangement of valve mechanisms similar to those illustrated in Fig. 1 except that three valves are shown in series, all of different diameters and pressure areas for controlling separate actuators for a tractor and two trailers. In this figure parts which correspond with those in Fig. 1 are given the same reference numerals with the addition of 300. As indicated in this figure the valve mechanism, V⁶, will control the brake mechanisms for the tractor, the valve mechanism, V⁷, will control the brake mechanisms for the first trailer, and the valve mechanism, V⁸, will control the brake mechanisms for the second trailer. The resistance spring, 350, is connected at one end to a fixed part of the chassis by the adjusting means, 351, and at the other end to the valve casing, 306ᵇ, of the valve mechanism, V⁸, the valve operating part, 320ᵇ, being connected by a link, 332ᵇ, with the valve casing, 360ᵃ, of valve mechanism, V⁷. In this installation we have shown a Bowden wire, 382, connected with the operator operated part, which is in the form of a hand lever, 380, provided with a locking pawl, 383, and segment, 384. The operation of this arrangement of the valve mechanisms will be substantially like that previously described with reference to Fig. 1, except that as there are three valve mechanisms of different diameters, the brake mechanisms for the rearmost trailer will be applied first and will reach their maximum efficiency before those of the first trailer and tractor, and the brake mechanisms of the first trailer will be applied before those of the tractor, and will reach their maximum efficiency before those of the tractor up to the point where the differential of fluid pressures on the largest valve mechanism is unable to overcome the increased tension of the spring, when all of the brake mechanisms will be applied with the maximum power of their respective actuators, thus preventing "jackknifing" and maintaining the couplings between the respective vehicles taut, both in the application and release of the brake mechanisms.

Figs. 9 and 10 represent slightly modified arrangements of the valve mechanism illustrating different locations for the resistance spring, it being understood that the parts are otherwise similar in construction and operation to those shown in Fig. 1, and corresponding parts are given the same reference characters with the addition of 400. Thus in Fig. 9 the foot lever, 480, is connected by link, 482, with the valve actuating part, 420$^a$, of valve mechanism, V$^9$, which in this instance is the smaller valve mechanism and is connected with the actuator for the trailer brakes. The larger valve mechanism, V$^{10}$, is reversed in its suspending yoke, 430, and has its valve actuating part, 420, connected by link, 432$^a$, with the chassis, the resistance spring, 450, being connected at one end to the casing, 406$^a$, of the smaller valve mechanism, and at the other end to the valve casing, 406, of the valve mechanism, V$^{10}$, which controls the actuator for the tractor brake mechanisms.

In Fig. 10 in which the parts corresponding with those illustrated in Fig. 1 are given the same reference numerals with the addition of 500 to avoid repetition, we have illustrated an arrangement of the valve mechanisms, V$^{11}$ and V$^{12}$, similar to that shown in Fig. 6, except that the valve actuating part, 520$^a$, of the valve mechanism, V$^{12}$, is connected to a fixed part of the chassis by a link rod, 532$^a$. In this instance the resistance spring, 550, is interposed between the foot lever, 580, and the casing, 506, of the valve, V$^{11}$. The construction and operation of the valves is otherwise as previously described.

In Fig. 11 we have illustrated another modification of the arrangement of the valve mechanisms, in which the parts corresponding to those shown in Fig. 1 are given the same reference characters with the addition of 600 to avoid repetition. In this figure the valve mechanisms are arranged in parallel and are of the same size, having the pressure areas of their various parts the same instead of different as in Fig. 1, and the other figures previously described. In this instance each valve mechanism is provided with a separate resistance spring, the resistance spring, 650$^a$, for the valve mechanism, V$^{14}$, which controls the trailer brakes being stronger than the resistance spring, 650, for valve mechanism, V$^{13}$, which controls the tractor brakes. In this instance the valve mechanisms have their valve operating parts, 620 and 620$^a$, pivotally connected to opposite ends of an equalizer, 682$^a$, which is connected between its ends by the link, 682, to the pedal lever, 680. Spring, 650, is connected at one end to the casing of the valve mechanism, V$^{13}$, and at its other end to a fixed part of the vehicle indicated at F, and the heavier spring, 650$^a$, has one end connected to the casing of valve mechanism, V$^{14}$, and the other end connected to the vehicle, as the fixed part, F$^1$. In the operation of the valve mechanisms shown in Fig. 11, it will be obvious that when the brakes are applied by a partial movement of the foot lever, 680, the differentials of fluid pressures on the valve mechanism, V$^{13}$, controlling the actuator for the tractor brakes, will overcome the weaker spring, 650, before the differential of fluid pressures on the valve, V$^{14}$, controlling the actuator for the trailer brakes, will overcome the stronger spring, 650$^a$, so that as hereinbefore described the trailer brakes will be applied first and to a greater extent than the tractor brakes up to the point where the tension of both springs is increased beyond the power of the differentials of fluid pressures on the valve mechanisms, to overcome the same when the brakes of both vehicles will be applied to the full extent of the power of their actuators. The construction shown in Fig. 11 is not herein specifically claimed, as it forms the subject matter of a separate application, a division of this application, filed by us September 12, 1929 and given Serial No. 392,005.

It will be understood that the various modified embodiments of our invention herein shown and described are illustrative of various applications of our invention, but that the changes therein may be made by different constructors to meet the requirements of special installations.

Where the valve mechanisms are interposed in connections between the operator operated part and the part connected with the vehicle, but having a limited movement with respect thereto and being also connected with the brake mechanisms, said connections providing lost motion with respect to the operator operated part to enable the operator to apply his physical force to certain brake mechanisms after all of the actuators have been applied to the maximum extent of their power, as illustrated for example in Fig. 6, it will be understood that the movable part connected with the brake mechanisms and with the operator operated part when released will always return to the same position, which in this figure will be determined by the stop, 131$^a$. If, however, it is found desirable, a special stop may be provided in addition to, or substitution for stop, 131$^a$, for arresting said movable part in its released position, and we have illustrated such a stop at 176$^c$, in Fig. 6, in connection with the movable arm, 177$^b$, on the rock shaft, 176.

In the accompanying drawings we have illustrated embodiments of our invention in which the actuators are of the type in which the cylinder is open at one end and the piston is exposed to atmospheric pressure on both faces, or submerged in atmosphere in the released position, and the particular valve mechanism illustrated is appropriate to that type of actuator, and being covered in its specific details by our former application, Serial No. 231,724, hereinbefore referred to.

What we claim and desire to secure by Letters Patent is:—

1. In a vacuum brake system for automotive vehicles, the combination with a plurality of independently operable brake mechanisms, a plurality of power actuators and sources of fluid pressure of different magnitude, each of said actuators being connected with certain of said brake mechanisms only, of a plurality of valve mechanisms, each being of different size from the other, each controlling certain of said actuators only, and each provided with relatively movable parts subjected to differentials of fluid pressures corresponding to those to which a movable part of an actuator which it controls, is exposed, and acting on the valve mechanism in a direction to prevent further increase in said differential of pressures, an operator operated part operatively connected with each of said valve mechanisms, yielding means acting upon each valve mechanism in opposition to the differential of fluid pressures thereon and in a different ratio with respect to the force exerted by said differential of fluid pressures as to each valve mechanism by virtue of the difference in size between said valves, each of said valve mechanisms being provided with means for connecting it with the relatively different sources of fluid pressures, whereby the operation of certain of said actuators or actuation thereof to a predetermined extent will be effected before the corresponding operation of another or other of said actuators.

2. In a vacuum brake system for automotive vehicles, the combination with a plurality of independently operable brake mechanisms, a plurality of power actuators and sources of fluid pressure of different magnitude, each of said actuators being connected with certain of said brake mechanisms only, of a plurality of valve mechanisms, each being of different size from the other, each controlling certain of said actuators only, and each provided with relatively movable parts subjected to differentials of fluid pressures corresponding to those to which a movable part of an actuator which it controls, is exposed, and acting on the valve mechanism in a direction to prevent further increase in said differential of pressures, an operator operated part operatively connected with each of said valve mechanisms, yielding means acting upon each valve mechanism in opposition to the differential of fluid pressures thereon and in a different ratio with respect to the force exerted by said differential of fluid pressures as to each valve mechanism by virtue of the difference in size between said valves, each of said valve mechanisms being provided with means for connecting it with the relatively different sources of fluid pressures, said valve mechanisms and said yielding resistance means being interposed in connections between the operator operated part and a part connected with the vehicle, and said valve mechanisms being movable bodily with respect to the vehicle.

3. In a vacuum brake system for automotive vehicles, the combination with a plurality of independently operable brake mechanisms, a plurality of power actuators and sources of fluid pressure of different magnitude, each of said actuators being connected with certain of said brake mechanisms only, of a plurality of valve mechanisms, each being of different size from the other, each controlling certain of said actuators only, and each provided with relatively movable parts subjected to differentials of fluid pressures corresponding to those to which a movable part of an actuator which it controls, is exposed, and acting on the valve mechanism in a direction to prevent further increase in said differential of pressures, an operator operated part operatively connected with each of said valve mechanisms, yielding means acting upon each valve mechanism in opposition to the differential of fluid pressures thereon and in a different ratio with respect to the force exerted by said differential of fluid pressures as to each valve mechanism by virtue of the difference in size between said valves, each of said valve mechanisms being provided with means for connecting it with the relatively different sources of fluid pressures, said valve mechanisms and said yielding resistance means being interposed in connections between the operator operated part and a part connected with the vehicle, and said valve mechanisms being movable bodily with respect to the vehicle, yielding retracting means for restoring the operator operated part to its normal position, and stops for limiting parts connected with said valve mechanisms to insure their return to normal position under the action of said retracting means.

4. In a vacuum brake system for automotive vehicles, the combination with independently operable brake mechanisms for a plurality of pairs of wheels, a plurality of power actuators and sources of fluid pressure of different magnitude, each of said actuators being connected with the brake mechanisms of certain of said pairs of wheels less than the whole number, of a plurality of valve mechanisms, each being of different size from the other, each controlling certain of said actuators, and each provided with relatively movable parts subjected to differentials of fluid pressures corresponding to those to which a movable part of an actuator which it controls, is exposed, and acting on the valve mechanism in a direction to prevent further increase in said differential of fluid pressures, means for connecting each of said valve mechanisms with the aforementioned sources of fluid pressures, an operator operated part connected with each of said valve mechanisms, yielding means acting upon each valve mechanism by virtue of the difference in size between said valves in opposition to the differential of fluid pressures thereon and in a different ratio with respect to the force exerted by differential of fluid pressures as to each valve mechanism, and in opposition to the movement of the operator operated part to effect the application of the brake mechanisms by said actuators, whereby the operation of the brake mechanisms for certain of said pairs of wheels or the actuation thereof to a predetermined extent will be effected before the corresponding operation of brake mechanisms for another or other of said pairs of wheels.

5. In a vacuum brake system for automotive vehicles including tractor and trailing vehicles, the combination with independently operable brake mechanisms for the tractor and trailer, sources of fluid pressure of different magnitude, a power actuator on the tractor connected with the brake mechanisms thereof, and a power actuator on a trailing vehicle, of a plurality of valve mechanisms on the tractor for independently controlling said actuators, each of said valve mechanisms being provided with relatively movable parts subjected to differentials of fluid pressures corresponding to those to which a movable part of an actuator which it controls, is exposed, and acting on the valve mechanism in a direction to prevent further increase in said differential of fluid pressures, means for connecting each valve mechanism with the aforementioned sources of fluid pressure, an operator operated part on the tractor operatively connected with each of said valve mechanisms, yielding means acting upon each valve mechanism in opposition to the differential of fluid pressures thereon and in a different ratio with respect to the force exerted by said differential of fluid pressures as to each valve mechanism, said ratios being such as to insure the operation of the actuator for the trailer brake mechanisms and the actuation thereof to a predetermined extent before the corresponding operation of the actuator for the tractor brake mechanisms.

6. In a vacuum brake system for automotive vehicles, the combination with a plurality of independently operable brake mechanisms and a plurality of power actuators, independent sources of relatively high and low fluid pressure each of which is connected with certain of said brake mechanisms only, of a plurality of valve mechanisms, each controlling certain of said actuators, and each provided with relatively movable parts subjected to differentials of fluid pressures corresponding to those to which a movable part of the actuator which it controls is exposed, and acting on the valve mechanism in a direction to prevent further increase in said differential of fluid pressures, means for connecting each of said valve mechanisms with said sources of fluid pressure, yielding means acting uniformly upon each valve mechanism in opposition to the differential of fluid pressures thereon, and operatively connected with said operator operated part to increase the tension of said yielding means by the movement of the operator operated part to apply the brake mechanisms, the corresponding parts of said valve mechanisms affected by said differentials of fluid pressures being of different areas, to effect the operation of certain of said actuators and the actuation thereof to a predetermined extent before the corresponding operation of another or other of said actuators.

7. In a vacuum brake system for automotive vehicles, the combination with a plurality of independently operable brake mechanisms independent sources of relatively high and low fluid pressure and a plurality of power actuators, each of which is connected with certain of said brake mechanisms only, of a plurality of valve mechanisms, each controlling certain of said actuators, and each provided with relatively movable parts subjected to differentials of fluid pressures corresponding to those to which a movable part of the actuator which it controls is exposed, and acting on the valve mechanism in a direction to prevent further increase in said differential of fluid pressures, means for connecting each of said valve mechanisms with the aforementioned sources of fluid pressure, yielding means acting uniformly upon each valve mechanism in opposition to the differential of fluid pressures thereon, and operatively connected with said operator operated part to increase the tension of said yielding means by the movement of the operator operated part to apply the brake mechanisms, the corresponding parts of said valve mechanisms affected by said differentials of fluid pressures being of different areas, said valve mechanisms being movable bodily with respect to the vehicle and located together with said yielding means in connections between said operator operated part and certain of said brake mechanisms, said operator operated part being connected by means permitting lost motion with the said certain brake mechanisms.

8. In a vacuum brake system for automotive vehicles including tractor and trailing vehicles, the combination with independently operable brake mechanisms for the tractor and trailer, independent sources of relatively high and low fluid pressures, a power actuator on the tractor connected with the brake mechanisms thereof, and a power actuator on a trailing vehicle, of a plurality of valve mechanisms on the tractor for independently controlling said actuators, each of said valve mechanisms being provided with relatively movable parts subjected to differentials of fluid pressures corresponding to those to which a movable part of the actuator which it controls, is exposed, and acting on the valve mechanism in a direction to prevent further increase in said differential of fluid pressures, means for connecting each valve mechanism with the aforementioned sources of fluid pressure, an operator operated part on the tractor operatively connected with each of said valve mechanisms, yielding means acting upon each valve mechanism uniformly in opposition to the differential of fluid pressures thereon, the corresponding parts of said valve mechanisms acted on by said differentials of fluid pressures being of different areas to insure the operation of the trailer brake mechanisms to a predetermined extent before the corresponding actuation of the actuator for the tractor brake mechanisms.

In testimony whereof we affix our signatures.

CALEB S. BRAGG.
VICTOR W. KLIESRATH.